United States Patent [19]

Foster et al.

[11] Patent Number: 4,535,113

[45] Date of Patent: Aug. 13, 1985

[54] OLEFIN POLYMER COMPOSITIONS CONTAINING SILICONE ADDITIVES AND THE USE THEREOF IN THE PRODUCTION OF FILM MATERIAL

[75] Inventors: George N. Foster, Bloomsbury, N.J.; Richard B. Metzler, Briarcliff Manor, N.Y.

[73] Assignee: Union Carbide Corporation, Danbury, Conn.

[21] Appl. No.: 587,007

[22] Filed: Mar. 13, 1984

[51] Int. Cl.$^3$ .............................................. C08K 5/54
[52] U.S. Cl. ..................... 524/262; 524/265; 524/581
[58] Field of Search ................ 524/581, 265, 262

[56] References Cited

U.S. PATENT DOCUMENTS

| | | |
|---|---|---|
| 2,930,809 | 3/1960 | Kenmore et al. ............ 528/38 |
| 2,947,771 | 8/1960 | Bailey ............................. 528/14 |
| 3,425,983 | 2/1969 | Wolfe, Jr. . |
| 3,585,230 | 6/1971 | Woycheshin et al. ........ 524/265 |
| 3,629,308 | 12/1971 | Bailey et al. .................... 528/25 |
| 3,649,588 | 3/1972 | Skipton ........................... 524/588 |
| 3,956,420 | 5/1976 | Kato et al. . |
| 3,960,985 | 6/1976 | Cooper . |
| 4,001,128 | 1/1977 | Penneck . |
| 4,006,176 | 2/1977 | Heckert et al. ............. 252/174.15 |
| 4,046,930 | 9/1977 | Johnson et al. ................ 528/27 |
| 4,202,807 | 5/1980 | Moretto et al. ............... 524/265 |
| 4,250,071 | 2/1981 | Perrey et al. ................. 524/265 |
| 4,265,801 | 5/1981 | Moody et al. . |
| 4,274,996 | 6/1981 | Hawley .......................... 524/265 |
| 4,426,480 | 1/1984 | Petty . |
| 4,430,470 | 2/1984 | Taniguchi et al. . |

FOREIGN PATENT DOCUMENTS 1294986 11/1972 United Kingdom .
1460128 12/1976 United Kingdom .
1505571 3/1978 United Kingdom .

Primary Examiner—Joseph L. Schofer
Assistant Examiner—N. Sarofim
Attorney, Agent, or Firm—James C. Arvantes; Robert C. Brown

[57] ABSTRACT

Olefin polymer compositions containing silicone additives which can be extruded through relatively narrow die gaps at commercial extrusion rates to provide film material characterized by improved mechanical and optical properties. The silicone additives have the formula:

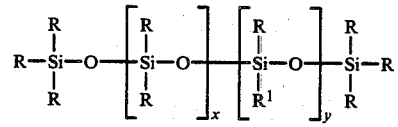

wherein each R, which can be the same or different, are alkyl radicals, $R^1$ is a monovalent organic radical containing at least one ethyleneoxide group, vicinal epoxy group or amino group and x and y, which can be the same or different, each have a value of at least one.

28 Claims, No Drawings

OLEFIN POLYMER COMPOSITIONS CONTAINING SILICONE ADDITIVES AND THE USE THEREOF IN THE PRODUCTION OF FILM MATERIAL

SUMMARY OF THE INVENTION

The disclosure of this application is directed to olefin polymer compositions, containing silicone additives, which can be extruded, particularly by the so-called bubble technique, into film material characterized by improved mechanical and optical properties. The silicone additives, which are added to the olefin polymers to provide compositions of this invention, fall within the scope of the following nominal formula:

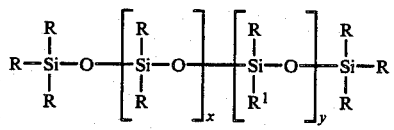

wherein each R, which can be the same or different, is an alkyl radical, $R^1$ is a monovalent organic radical containing at least one ethyleneoxide group $—C_2H_4O—$, vicinal epoxy group

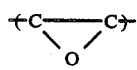

or amino group

and x and y, which can be the same or different, each have a value of at least one.

BACKGROUND OF THE INVENTION

Olefin polymers have been used for a number of years to produce film material by an extrusion process commonly referred to as the "bubble" technique. The bubble technique involves melting polymer pellets or granules, extruding the melt from an annular die as a film in the form of a bubble and withdrawing the film from the die at a rate greater than the rate of extrusion while maintaining positive air pressure within the interior of the bubble. Film, so produced, is oriented or stretched in the machine or longitudinal direction and in the transverse direction and as a result is characterized, generally, by improved mechanical properties.

As a general rule, there are so-called "dead spots" or "hang-up" areas in the extruder wherein molten polymer tends to stagnate. Consequently, portions of the polymer melt remain in the extruder for extended periods of time and undergo premature crosslinking or thermal degradation. In time, as these crosslinked or thermally degraded portions of polymer are flushed out into the main polymer stream, they cause optical degradation, known as pin-striping and gel-streaking, in the extruded film. Pin-striping is manifested by haze bands which are aligned in the machine direction of the extruder. Gel-streaking is manifested by surface roughness.

Optical degradation is accentuated in film extruded from substantially linear, low density ethylene polymers prepared under conditions of low pressures in the presence of transition metal catalysts known in the art as Ziegler-Natta catalysts. Halide residues of these catalyst systems tend to accelerate the premature crosslinking of portions of the ethylene polymer within the extruder, accentuating optical degradation. In fact, optical degradation not only adversely affects the optical and mechanical properties of the extruded film, but in addition, can cause severe problems with respect to maintaining the stability of the "bubble" during the film forming process.

In addition to the problem of optical degradation, low density, ethylene polymers, as previously described, because of their narrow molecular weight distribution and related rheological characteristics, must be processed through relatively wide extruder die gaps, on the order of 60 to 125 mils, to prevent melt fracture, that is, extrudate irregularities, at commercial film extrusion rates. The use of wide extrusion die gaps, however, undesirably increases the amount of orientation in the machine direction which, in turn, promotes directional weakness due to the resultant unbalanced orientation.

DETAILED DESCRIPTION OF THE INVENTION

The present invention provides compositions, based on olefin polymers and silicone additives, which can be extruded into film material characterized by improved machanical and optical properties utilizing extruders having relatively narrow extruder die gaps, on the order of about 20 to about 45 mils and at commercial extrusion rates, on the order of about 6 to about 18 lbs/hr per inch of die circumference.

The compositions of this invention comprise olefin polymers and silicone additives falling within the scope of the following nominal formula:

Formula I

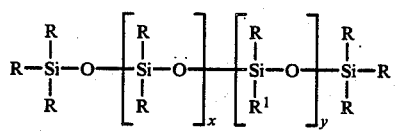

wherein each R, which can be the same or different, is an alkyl radical, preferably having one to six carbon atoms inclusive, $R^1$ is a monovalent organic radical containing at least one ethyleneoxide group $—C_2H_4O—$, vicinal epoxy group

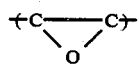

or amino group

and x and y, which can be the same or different, each have a value of at least one, generally have a value of about 4 to about 5,000 and preferably have a value of about 4 to about 500.

Olefin polymers suitable for purposes of this invention are normally solid materials and include homopolymers of olefins as well as interpolymers of one or more olefins with each other and/or up to about 30 percent by weight of one or more monomers which are copolymerizable with such olefins. Homopolymers and interpolymers of such olefins as ethylene, propylene, butene-1, isobutylene, hexene-1, 4-methyl-pentene-1, pentene-1, octene-1, nonene-1, decene-1 as well as interpolymers of one or more of such olefins and one or more of other monomers which are interpolymerizable with such alpha-olefins, such as vinyl and diene compounds, are suitable for purposes of this invention.

Exemplary interpolymers are ethylene copolymers such as ethylene-propylene copolymers, ethylene-butene-1 copolymers, ethylene-hexene-1 copolymers, ethylene-octene-1 copolymers, polymers of ethylene and two or more of the following compounds: propylene, butene-1, hexene-1, 4-methyl-pentene-1, octene-1 and the like.

Also included in the term olefin polymer are blends of one polymer with one or more other polymers. Illustrative of such blends are ethylene/olefinic polymers with one or more of the following: polypropylene, high pressure, low-density polyethylene, high density polyethylene, polybutene-1 and polar monomer containing, olefin copolymers such as ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers, ethylene/acrylic acid/vinyl acetate terpolymers and the like.

Particularly preferred ethylene polymers for purposes of this invention are low pressure, substantially linear ethylene homopolymers and ethylene-$C_3$ to $C_8$ alpha olefin interpolymers having a density of about 0.850 to about 0.970, preferably about 0.875 to about 0.930. These interpolymers can be prepared by reacting a mixture containing about 50 to 99.9 mole percent, preferably about 75 to 96 mole percent ethylene and from about 0.1 to 50 mole percent and preferably about 4 to about 25 mole percent of one or more $C_3$ to $C_8$ alpha olefins such as propylene, butene-1, pentene-1, 4-methyl-pentene-1, hexene-1, heptene-1, octene-1 and the like, using a magnesium chloride/titanium chloride catalyst and employing low pressures on the order of about 15 to 300 psi as disclosed in U.S. Pat. No. 4,302,565, granted Nov. 24, 1981.

The silicone additives can be prepared by means well known to those skilled in silicone chemistry. For example, the precursor of the silicone additives, which are utilized to provide the compositions of this invention, have the nominal formula:

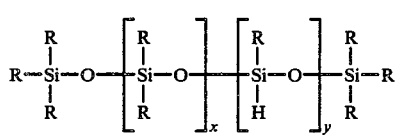

Formula II wherein the variables are as previously defined, can be conveniently prepared by reacting a mixture containing hexamethyldisiloxane, octamethylcyclotetrasiloxane, trimethyl end blocked methyl hydrogen polysiloxane and an acid catalyst. The number of repeating units can be varied, as desired, by varying the mole ratio of the reactants. A specific procedure for preparing a precursor falling within the scope of the above formula is set forth in Example 2 of U.S. Pat. No. 4,046,930 granted Sept. 6, 1977. The precursor is then reacted with an unsaturated organic compound containing at least one ethyleneoxide group, vicinal epoxy group or amino group, in the presence of a platinum catalyst such as chloroplatinic acid. This type of reaction is also described in Example 2 of U.S. Pat. No. 4,046,930.

The silicone additives are added to the olefin polymers in amounts sufficient to improve the mechanical and/or optical properties of the ultimate compositions, such as pin striping/gel streaking and/or melt-fracture. As a general rule, the amounts range from about 0.01 to about 5 percent by weight, preferably about 0.02 to about 0.5 percent by weight, based on the total weight of the composition.

The admixture of the silicone additives and olefin polymers can be conveniently effected in a suitable mixer such as a Banbury mixer and the like.

To the compositions of this invention can be also added various materials commonly added to extrudable compositions. These materials include additives such as pigments, lubricants, slip agents, antioxidants, antiblock agents and the like in amounts well known in the art.

In the following examples, which further illustrate the present invention, films were produced, examined visually as to melt fracture, gel streaking/pin striping and rated. Ratings are indicated below:

| Pin Striping/Gel Streaking | |
|---|---|
| 0 | None |
| 1 | Slight |
| 2 | Moderate |
| 3 | Severe |
| Melt Fracture | |
| 0 | None |
| 1 | Slight |
| 2 | Moderate |
| 3 | Severe |

Additives, including silicones, which are added to the compositions, are referred to as processing aids and are described below.

| Compositions | Processing Aids |
|---|---|
| | (formulas are referred to as nominal formulas) |
| Control 1 | no processing aid |
| Control 2 | zinc stearate |
| Control 3 | commercially available silicone oil having the formula: |

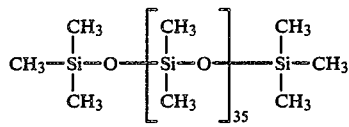

| Control 4 | commercially available silicone oil having the formula: |

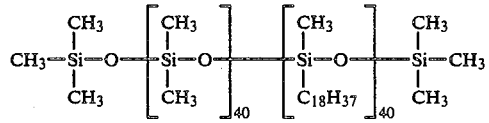

Control 5

-continued

| Compositions | Processing Aids |
|---|---|
| 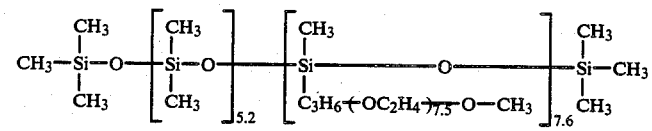<br>produced by reacting allyl-methylpolypropyleneoxide with a compound falling within the scope of Formula II | |

EXAMPLE 1

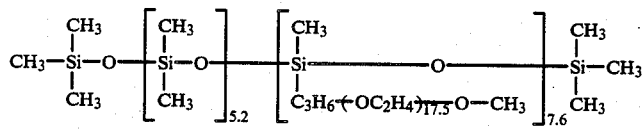

produced by reacting allylmethylpolyethyleneoxide with a compound falling within the scope of Formula II

EXAMPLE 2

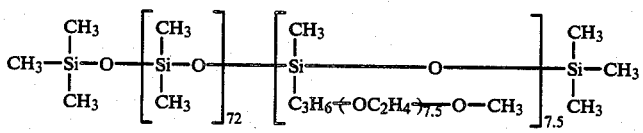

produced by reacting allylmethylpolyethyleneoxide with a compound falling within the scope of Formula II

EXAMPLE 3

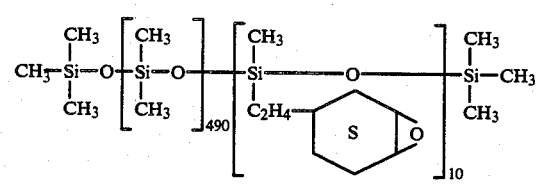

produced by reacting allylmethylpolyethyleneoxide with a compound falling within the scope of Formula II

EXAMPLE 4

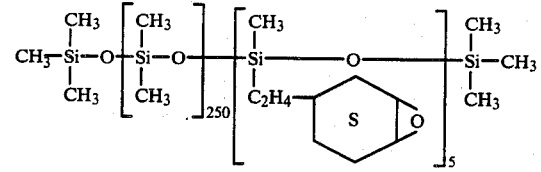

produced by reacting vinyl cyclohexenemonoxide with a compound falling within the scope of Formula II

EXAMPLE 5

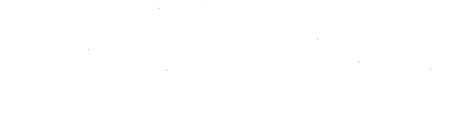

produced by reacting vinyl cyclohexenemonoxide with a compound falling within the scope of Formula II

EXAMPLE 6

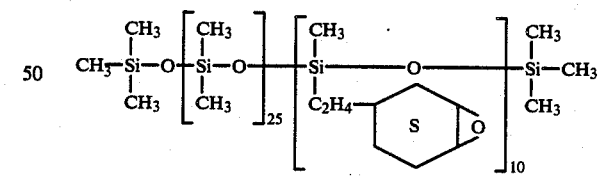

produced by reacting vinyl cyclohexene monoxide with a compound falling within the scope of Formula II

EXAMPLE 7

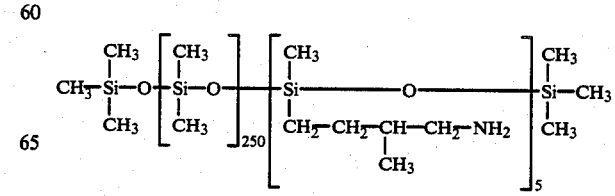

produced by reacting 3-methyl-4-aminobutene-1

-continued
with a compound falling within the scope of Formula II

EXAMPLE 8

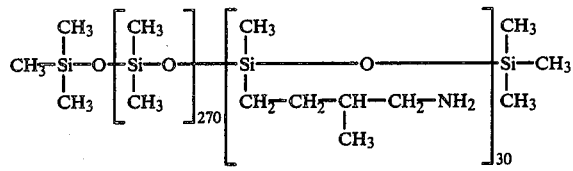

produced by reacting 3-methyl-4-aminobutene-1
with a compound falling within the scope of Formula II

EXAMPLE 9

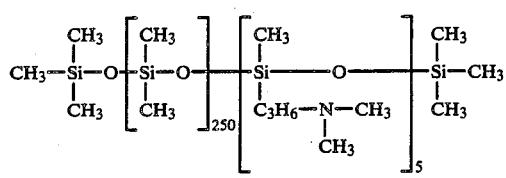

produced by reacting allyldimethylamine
with a compound falling within the scope of Formula II

EXAMPLE 10

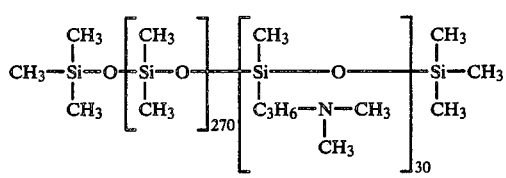

produced by reacting allyldimethylamine
with a compound falling within the scope of Formula II For a more detailed description as to the preparation of polyethyleneoxide modified silicones, reference is made to U.S. Pat. No. 3,629,308.

As previously pointed out, U.S. Pat. No. 4,046,930 can be referred to as disclosing the preparation of the epoxy and amino modified silicones of this invention.

A particularly preferred method of preparing the amino modified silicones of this invention is through the initial production of diethoxy(methyl)[3-methyl-4-aminobutyl]silane, which has the formula:

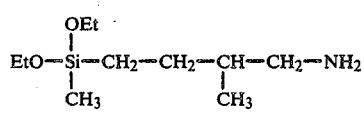
Formula III

This compound can be produced according to Example 3 of U.S. Pat. No. 2,930,809 by substituting diethoxy(methyl)[3-methyl-3-cyanopropyl]silane for the gamma-cyanopropylmethyldiethoxysilane. The former compound is conveniently prepared by the platinum catalyzed hydrosilyation of 2-methyl-3-butenenitrile by methyldichlorosilane followed by esterification with ethanol and subsequent distillation.

The compound of Formula III is then hydrolyzed and the resultant hydrolyzate reacted, according to Example 1 of U.S. Pat. No. 2,947,771 to produce the desired amino modified silicone.

PREPARATIONS OF COMPOSITIONS OF CONTROLS 2-5 AND EXAMPLES 1-10

A masterbatch was prepared by admixing the components, identified below, in a Banbury mixer.

|  | Percent by Weight |
|---|---|
| High pressure ethylene homopolymer having a melt index of 2.0 and a density of 0.918 gm/cm$^3$ | 87.95 |
| Finely divided diatomaceous earth, fluxed with sodium carbonate, having an average particle size of about 6 μm and a pH of about 10 (antiblock agent) | 10.0 |
| Octadecyl 3(3'5'-di-tert-butyl-4'-hydroxyphenyl) propionate (antioxidant) | 0.05 |
| Processing Aid (when used) | 2.0 |

The masterbatch, in an amount of 2.5 percent by weight was dry blended with a composition containing:

|  | |
|---|---|
| Substantially linear, low pressure ethylene-butene-1 copolymer having a melt index of 1.0 and a density of 0.918 gm/cm$^3$ | 99.98 |
| Octadecyl 3(3',5'-di-tert-butyl-4'-hydroxyphenyl) propionate | 0.02 |

Control 1 was formulated by admixing 99.98 percent by weight low pressure ethylene-butene-1 copolymer with 0.02 percent by weight antioxidant, both components described above.

In conducting the melt fracture test, compositions were extruded from a 1.5 inch extruder having a 3 inch die with a 30 mil standard gap, operating at a temperature of 190° C. and at an output of about 3.7 lbs/hr per inch of die circumference, while running a nitrogen purge on the hopper of the extruder. In conducting the pin striping/gel streaking test, the nitrogen purge was turned off and the output dropped to 2.2 lbs/hr per inch of die circumference in order to avoid possibility of melt fracture.

The 1.5 mil film produced was examined visually and rated as set forth in Table 1.

TABLE 1

| Percent by Weight Processing Aid | | Rating | |
|---|---|---|---|
| | | Pin Striping/ Gel Streaking | Melt Fracture |
| 0 | Control 1 | 2 | 3 |
| 0.05 | Control 2 | 2 | 2 |
| 0.05 | Control 3 | 2 | 3 |
| 0.05 | Control 4 | 2 | 3 |
| 0.05 | Control 5 | 2 | 3 |
| 0.05 | Example 1 | 0 | 1 |
| 0.05 | Example 2 | 0 | 0 |
| 0.05 | Example 3 | 0 | 0 |
| 0.05 | Example 4 | 2 | 0 |
| 0.05 | Example 5 | 3 | 1 |
| 0.05 | Example 6 | 1 | 1 |
| 0.05 | Example 7 | 2 | 2 |
| 0.05 | Example 8 | 0 | 1 |
| 0.05 | Example 9 | 0 | 2 |

TABLE 1-continued

| Percent by Weight Processing Aid | Rating | |
|---|---|---|
| | Pin Striping/ Gel Streaking | Melt Fracture |
| 0.05 Example 10 | 0 | 0 |

Composition of Control 1 and modified compositions of Examples 1, 3 and 10 were also extruded from a 2½ inch extruder having a 3 inch die with 40 mil standard gap operating at a temperature of 213° C.–219° C. and at an output of about 7.2 lbs/hr per inch of die circumference. Modification involved adding the processing aid in an amount of 0.1 percent by weight by using 5 percent by weight of the masterbatch.

The 1.5 mil film produced was examined visually and rated as set forth in Table II:

TABLE II

| | Melt Fracture |
|---|---|
| Control 1 | 3 |
| Example 1 (modified) | 1 |
| Example 3 (modified) | 0 |
| Example 10 (modified) | 0 |

Although the compositions of this invention have been described in reference to extruded film products, it is to be understood that the compositions can be formed into shaped articles of desired configuration by molding techniques, in general, such as blow molding, profile extrusion, injection molding and the like.

What is claimed is:

1. An extrudable composition comprising an olefin polymer and a silicone additive having the formula:

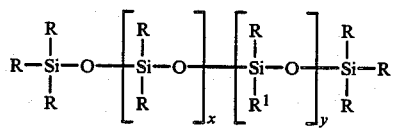

wherein each R is an alkyl radical, R$^1$ is a monovalent organic radical containing at least one ethylene oxide group, vicinal epoxy group or amino group and x and y each have a value of at least 1, said silicone additive being present in an amount sufficient to improve mechanical and/or optical properties.

2. A composition as defined in claim 1 wherein R of the silicone additive is an alkyl radical having one to 6 carbon atoms inclusive.

3. An extrudable composition comprising a olefin homopolymer or interpolymer of an alpha olefin and a silicone additive having the formula:

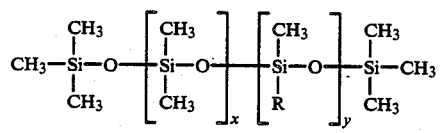

wherein R is a monovalent organic radical containing at least one ethylene oxide group, vicinal epoxy group or amino group and x and y each have a value of at least one, said silicone additive being present in an amount sufficient to improve mechanical and/or optical properties.

4. A composition as defined in claim 1 or claim 3 wherein x and y each have a value of about 4 to about 5,000.

5. A composition as defined in claim 1 or claim 3 wherein x and y each have a value of about 4 to about 500.

6. A composition as defined in claim 1 or claim 3 wherein the silicone additive is present in an amount of about 0.01 to about 5 percent by weight.

7. A composition as defined in claim 1 or claim 3 wherein the silicone additive is present in an amount of about 0.02 to about 0.5 percent by weight.

8. A composition as defined in claim 3 wherein said olefin polymer has a density of about 0.850 to about 0.970.

9. A composition as defined in claim 3 wherein said olefin polymer has a density of about 0.875 to about 0.930.

10. A composition as defined in claim 1 or claim 3 wherein said olefin polymer is an ethylene homopolymer.

11. A composition as defined in claim 1 or claim 3 wherein said olefin polymer is a copolymer of ethylene and an alpha olefin.

12. A composition as defined in claim 1 or claim 3 wherein said olefin polymer is a copolymer of ethylene and butene-1.

13. A composition as defined in claim 1 or claim 3 wherein the silicone additive has the formula:

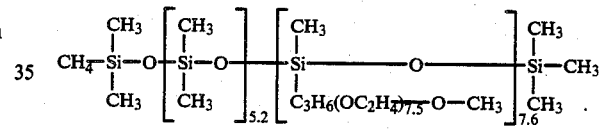

14. A composition as defined in claim 1 or claim 3 wherein the silicone additive has the formula:

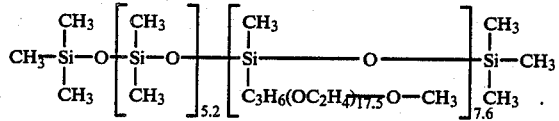

15. A composition as defined in claim 2 or claim 3 wherein the silicone additive has the formula:

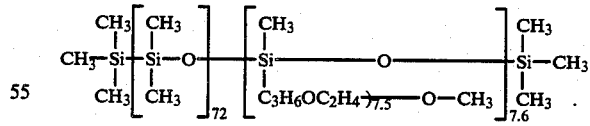

16. A composition as defined in claim 1 or claim 3 wherein the silicone additive has the formula:

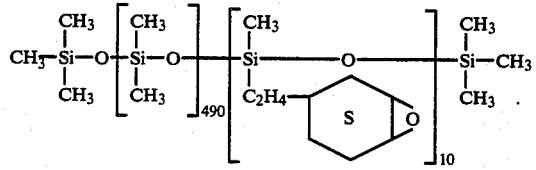

17. A composition as defined in claim 1 or claim 3 wherein the silicone additive has the formula:

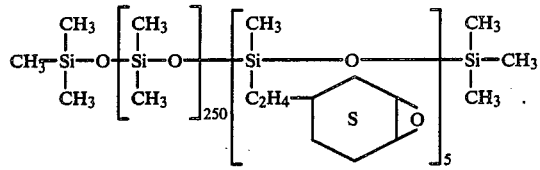

18. A composition as defined in claim 1 or claim 3 wherein the silicone additive has the formula:

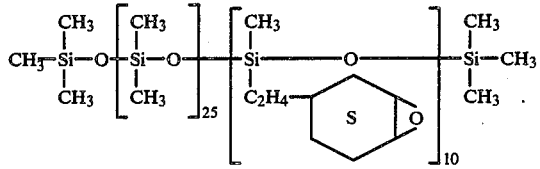

19. A composition as defined in claim 1 or claim 3 wherein the silicone additive has the formula:

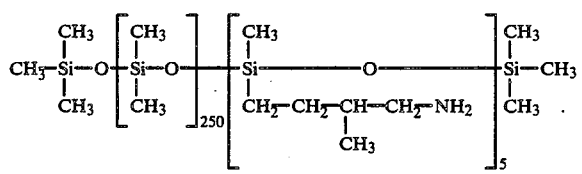

20. A composition as defined in claim 1 or claim 3 wherein the silicone additive has the formula:

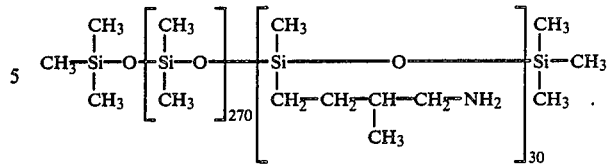

21. A composition as defined in claim 1 or claim 3 wherein the silicone additive has the formula:

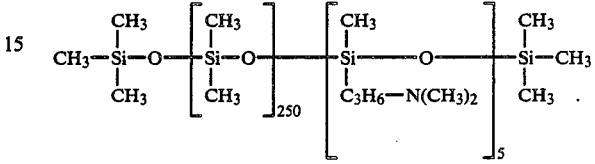

22. A composition as defined in claim 1 or claim 3 wherein the silicone additive has the formula:

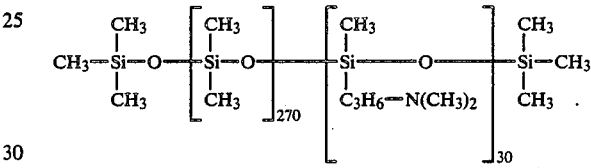

23. A method of producing film characterized by improved mechanical and/or optical properties which comprises extruding a composition as defined in claim 1 or claim 3 through an extruder having die gaps on the order of about 20 to about 45 mils at an extrusion rate of about 6 to about 18 lbs/hr per inch of die circumference.

24. Shaped products of the compositions defined in claim 1.

25. Film products of the compositions defined in claim 1.

26. A composition as defined in claim 1 or claim 3 wherein $R^1$ is a monovalent organic radical containing at least one ethylene oxide group.

27. A composition as defined in claim 1 or claim 3 wherein $R^1$ is a monovalent organic radical containing at least one vicinal epoxy group.

28. A composition as defined in claim 1 or claim 3 wherein $R^1$ is a monovalent radical containing at least one amino group.

* * * * *

UNITED STATES PATENT AND TRADEMARK OFFICE
CERTIFICATE OF CORRECTION

PATENT NO. : 4,535,113
DATED : August 13, 1985
INVENTOR(S) : George N. Foster et al It is certified that error appears in the above-identified patent and that said Letters Patent is hereby corrected as shown below:

| | |
|---|---|
| Column 2, line 31 | "machanical" should read -- mechanical -- |
| Column 8, line 4 | "PREPARATIONS" should read -- PREPARATION -- |
| Column 9, line 10 | "with 40" should read -- with a 40 -- |
| Claim 3, line 1 | "a olefin" should read -- an olefin -- |
| Claim 13, extreme left of formula | "$CH_4$" should read -- $CH_3$ -- |
| Claim 15, line 1 | "claim 2" should read -- claim 1 -- |

UNITED STATES PATENT AND TRADEMARK OFFICE
CERTIFICATE OF CORRECTION

PATENT NO. : 4,535,113

DATED : August 13, 1985

INVENTOR(S) : George N. Foster et al

It is certified that error appears in the above-identified patent and that said Letters Patent is hereby corrected as shown below:

Claim 15             The formula should read

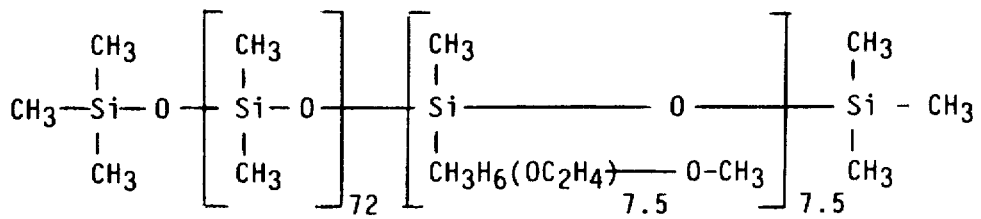

Claim 28, line 2      after "monovalent" insert -- organic --

Signed and Sealed this

Seventh Day of January 1986

[SEAL]

Attest:

DONALD J. QUIGG

Attesting Officer      Commissioner of Patents and Trademarks